United States Patent
Yamanaka et al.

(10) Patent No.: US 7,336,576 B2
(45) Date of Patent: Feb. 26, 2008

(54) OPTICAL DISK MEDIUM AND OPTICAL DISK RECORDING/REPRODUCING APPARATUS UTILIZING TILT DETECTION AREAS HAVING SPECIAL MARKS

(75) Inventors: Yutaka Yamanaka, Tokyo (JP); Ryuichi Katayama, Tokyo (JP); Takeharu Shibatoko, Tokyo (JP); Masatsugu Ogawa, Tokyo (JP); Daisuke Eto, Tokyo (JP); Chosaku Noda, Tokyo (JP); Hiroharu Satoh, Tokyo (JP); Hideaki Ohsawa, Tokyo (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 498 days.

(21) Appl. No.: 10/796,579

(22) Filed: Mar. 9, 2004

(65) Prior Publication Data

US 2005/0111344 A1    May 26, 2005

(30) Foreign Application Priority Data

Mar. 10, 2003  (JP) ............. 2003-062803
Jan. 30, 2004  (JP) ............. 2004-024519

(51) Int. Cl.
G11B 7/24   (2006.01)
(52) U.S. Cl. ............... 369/53.19; 369/275.3; 369/275.4
(58) Field of Classification Search ............. 369/275.4, 369/275.3, 53.19; G11B 7/24
See application file for complete search history.

(56) References Cited

U.S. PATENT DOCUMENTS 5,867,474 A * 2/1999 Nagasawa et al. ....... 369/275.3
5,978,332 A 11/1999 Itakura et al.
6,157,600 A 12/2000 Nakamura et al.
6,181,657 B1 1/2001 Kuroda et al.
6,314,067 B1 11/2001 Chung et al.
2002/0039338 A1 4/2002 Kadowaki et al.

FOREIGN PATENT DOCUMENTS

| CN | 1229238 | 9/1999 |
|---|---|---|
| EP | 0 886 266 | 12/1998 |
| EP | 0 944 048 | 9/1999 |
| EP | 1 031 970 | 8/2000 |
| EP | 1 213 712 | 6/2002 |
| JP | 8-279160 | 10/1996 |
| JP | 9-17029 | 1/1997 |
| JP | 10-302319 | 11/1998 |
| JP | 11-86310 | 3/1999 |
| JP | 11-312339 | 11/1999 |
| JP | 2000-348351 | 12/2000 |
| JP | 2001-67689 | 3/2001 |
| JP | 2001-118274 | 4/2001 |
| JP | 2002-175636 | 6/2002 |
| JP | 2002-288859 | 10/2002 |

OTHER PUBLICATIONS

European Search Report dated Sep. 29, 2006, from corresponding European Application No. 04090096.1-2210.

* cited by examiner

*Primary Examiner*—A M Psitos
(74) *Attorney, Agent, or Firm*—Katten Muchin Rosenman LLP

(57) ABSTRACT

In an optical disk medium, land recording tracks (1) are coupled by first and second coupling portions (3 and 4) at a particular radial position to form a tilt detecting mark SM.

10 Claims, 7 Drawing Sheets

REFLECTED LIGHT AMOUNT
TRACKING DIRECTION

REFLECTED LIGHT AMOUNT
TRACKING DIRECTION

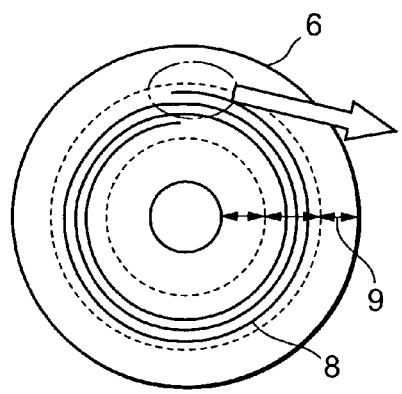 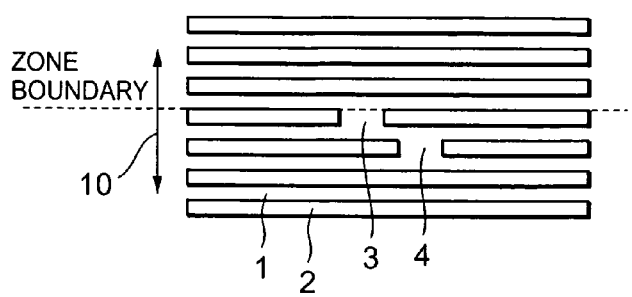
FIG. 9A          FIG. 9B
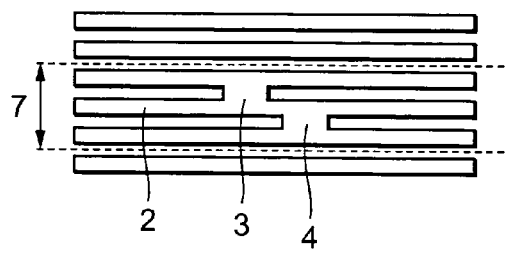 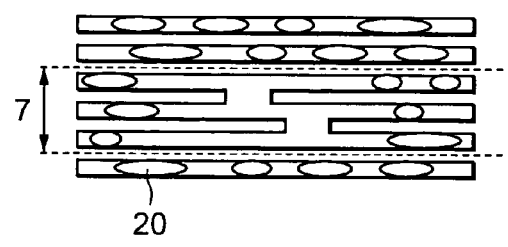
FIG. 10A          FIG. 10B

OPTICAL DISK MEDIUM AND OPTICAL DISK RECORDING/REPRODUCING APPARATUS UTILIZING TILT DETECTION AREAS HAVING SPECIAL MARKS This invention claims priority to prior Japanese application JP 2003-62803, the disclosure of which is incorporated herein by reference.

BACKGROUND OF THE INVENTION

This invention relates to an optical disk medium for use in recording and reproducing information or data by the use of a small optical spot and to an optical disk recording/reproducing apparatus.

In order to protect a recording layer having a thickness on the order of microns, data recording/reproducing (read/write) operations for an optical disk is carried out by the use of an optical system. Specifically, a small optical spot is formed by an objective lens through a transparent optical disk substrate having a thickness of 1.2 mm in case of a CD (Compact Disk) and 0.6 mm in case of a DVD (Digital Versatile Disk).

It is known that, in the above-mentioned optical system, relative tilt between the optical disk substrate and the objective lens may cause optical wavefront aberration, resulting in enlargement or asymmetry of the optical spot, which deteriorates recording/reproducing (read/write) characteristics.

An optical disk medium has a disk-like or a circular shape. Therefore, when a center portion of the optical disk medium is placed on a spindle of an optical disk recording/reproducing apparatus, the tilt of the optical disk medium is often caused to occur in a radial direction perpendicular to a recording track formed in a spiral fashion.

In order to suppress the deterioration in recording/reproducing characteristics owing to the above-mentioned tilt, the standard for the optical disk medium limits an allowable tilt upon production of the optical disk medium. On the other hand, the optical disk recording/reproducing apparatus adopts tilt control in which the tilt of the optical disk medium is detected and the tilt of the objective lens is changed and adjusted in correspondence to the tilt of the optical disk medium so as to assure stable recording/reproducing characteristics.

In the tilt control, it is a problem how to detect the tilt of the optical disk medium.

As a known technique, proposal has been made of a method of detecting the tilt by the use of pre-pits in a DVD-RAM (Random Access Memory). Referring to FIG. 1, a pre-pit portion of the DVD-RAM has a track structure which will presently be described. A land recording track 1 and a groove recording track 2 are alternately arranged. On a boundary line between the land recording track 1 and the groove recording track 2, a plurality of first pre-pits 14 and a plurality of second pre-pits 15 are formed. The first and the second pre-pits 14 and 15 are alternately arranged on left and right sides as seen from each of the land and the groove recording tracks 1 and 2.

Upon occurrence of tilt of the optical disk medium in the radial direction perpendicular to the recording tracks, the intensity distribution of the optical spot becomes asymmetrical on the left and the right sides with respect to a recording track center under the influence of aberration. For example, it is assumed that the optical spot follows the groove recording track as depicted by a dash-and-dot line in the figure. Before occurrence of tilt, a first push-pull signal upon passing through each first pre-pit 14 is equal in amplitude to and opposite in sign to a second push-pull signal upon passing through each second pre-pit 15. Once the tilt occurs, the first and the second push-pull signals are different in amplitude because the optical spot is asymmetrical. Therefore, by detecting the signal levels of the push-pull signals when the optical spot passes through the first and the second pre-pits, the tilt can be detected.

However, the change in signal level of the push-pull signal not only occurs by the tilt of the optical disk medium but also occurs when the first and the second pre-pits are not exactly formed at symmetrical positions on left and right sides with respect to the recording track center but are displaced or deviated. In the optical disk medium having a recording track interval on the order of submicron, it is difficult to form the pre-pits at accurate pit positions. Therefore, it is impossible to distinguish whether the change in signal level of the push-pull signal actually results from the tilt of the optical disk medium or from the positioning error of the pre-pits.

In a next-generation high-density optical disk using a blue light source, the allowable tilt is further reduced. Therefore, a method higher in reliability of detection is required.

Japanese Patent Publication (JP-A) No. 2001-118274 discloses a groove comprising wobbled groove parts and straight groove parts alternately connected in order to detect the tilt of the optical disk medium. The wobbled groove part has opposite side walls having a wobbled structure. The straight groove part has opposite side walls having a straight shape without being wobbled.

Japanese Patent Publication (JP-A) No. H10-302319 discloses an optical recording medium in which a land portion or a groove portion has a part whose center line parallel to the tracking direction is deviated from the recording track center.

SUMMARY OF THE INVENTION

It is an object of this invention to provide an optical disk medium and an optical disk recording/reproducing apparatus capable of obtaining a tilt detection signal which is suitable for practical use and which has high reliability.

An optical recording medium according to this invention and an optical disk recording/reproducing apparatus according to this invention are as follows:

(1) An optical disk medium (6) having a spiral recording track (8), wherein:

the optical disk medium comprises a plurality of tilt detection areas (7) formed at a plurality of radial positions on the medium, each of the tilt detection areas having a plurality of special marks (SM) for detecting a plurality of tilts of the medium in a single round of the medium.

(2) An optical disk medium according to (1), in which the spiral recording track is divided into a plurality of zones (9) in a radial direction of the medium, wherein:

each of the tilt detection areas is located within an area (10) which is formed in the vicinity of a zone boundary between the zones and which is not used in recording data.

(3) An optical disk medium according to (1), in which the spiral recording track having a predetermined linear recording density is divided into a plurality of segments (11) having a predetermined segment length and added with address information, wherein:

each of the detection areas is located on the recording track in the vicinity of a radial position at which the length of the recording track in a single round of the medium corresponds to an integral multiple of the segment length.

(4) An optical disk medium according to (1), wherein:

a plurality of grooves are periodically formed in a radial direction of the medium, the optical disk medium having, as the recording track, the grooves or a plurality of lands between the grooves or both of the grooves and the lands;

each of the special marks being formed by first and second coupling portions (3 and 4) arranged in close proximity to each other in a tracking direction along which the recording track extends, the first coupling portion (3) being formed as a coupling groove having a depth substantially equal to that of the grooves and a length in the tracking direction which is longer than twice a groove pitch of the grooves, the first coupling portion coupling a particular one of the grooves and one of two grooves adjacent to the particular groove on opposite sides thereof, the second coupling portion (4) being formed as a coupling groove having a depth substantially equal to that of the grooves and a length in the tracking direction which is longer than twice the groove pitch, the second coupling portion coupling the particular groove and the other of the two grooves.

(5) An optical disk medium according to (1), wherein:

a plurality of grooves are periodically formed in a radial direction of the medium, the optical disk medium having, as the recording track, both of the grooves and lands between the grooves;

each of the special marks being formed by first and second coupling portions (3 and 4) arranged in close proximity to each other in a tracking direction along which the recording track extends, the first coupling portion (3) being formed as a coupling land having a height substantially equal to that of the lands and a length in the tracking direction which is longer than twice a groove pitch of the grooves, the first coupling portion coupling a particular one of the lands and one of two lands adjacent to the particular land on opposite sides thereof, the second coupling portion (4) being formed as a coupling land having a height substantially equal to that of the lands and a length in the tracking direction which is longer than twice the groove pitch, the second coupling portion coupling the particular land and the other of the two lands.

(6) An optical disk recording/reproducing apparatus for recording or reproducing data on an optical disk medium, the optical disk medium comprising:

a plurality of grooves as a recording track; and a plurality of special marks (SM), each of the special marks being formed by first and second coupling portions (3 and 4) arranged in close proximity to each other in a tracking direction along which the recording track extends, the first coupling portion (3) coupling a particular one of the grooves and one of two grooves adjacent to the particular groove on opposite sides thereof, the second coupling portion (4) coupling the particular groove and the other of the two grooves, wherein:

the apparatus detects a medium tilt of the medium from the change in reflected light amount at each of the first and the second coupling portions when an optical spot follows the recording track.

(7) An optical disk recording/reproducing apparatus according to (6), wherein:

tilt control is carried out by the use of an average of the medium tilts detected at the special marks in a single round of the medium.

(8) An optical disk recording/reproducing apparatus according to (6), wherein:

tilt control is carried out by the use of a detected value of the medium tilt in a closest tilt detection area on an inner side of the recording track when the recording track is subjected to a recording operation or a reproducing operation.

(9) An optical disk recording/reproducing apparatus for recording or reproducing data on an optical disk medium, the optical disk medium comprising:

a plurality of lands as a recording track; and a plurality of special marks (SM), each of the special marks being formed by first and second coupling portions (3 and 4) arranged in close proximity to each other in a tracking direction along which the recording track extends, the first coupling portion (3) coupling a particular one of the lands and one of two lands adjacent to the particular land on opposite sides thereof, the second coupling portion (4) coupling the particular land and the other of the two lands, wherein:

the apparatus detects a medium tilt of the medium from the change in reflected light amount at each of the first and the second coupling portions when an optical spot follows the recording track.

(10) An optical disk recording/reproducing apparatus according to (9), wherein:

tilt control is carried out by the use of an average of the medium tilts detected at the special marks in a single round of the medium.

(11) An optical disk recording/reproducing apparatus according to (9), wherein:

tilt control is carried out by the use of a detected value of the medium tilt in a closest tilt detection area on an inner side of the recording track when the recording track is subjected to a recording operation or a reproducing operation.

According to this invention, it is possible to achieve a magnetic disk medium or an optical disk recording/reproducing apparatus capable of obtaining a stable and reliable tilt detection signal.

BRIEF DESCRIPTION OF THE DRAWINGS

FIGS. 9A and 9B are views for describing a medium having a zone structure;

FIGS. 10A and 10B are views for describing a special mark according to another embodiment of this invention;

DESCRIPTION OF THE PREFERRED EMBODIMENTS

Figure 1:
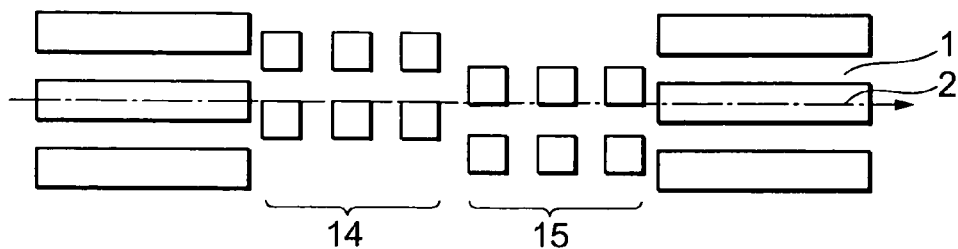
FIG. 1 shows an existing recording track with pre-pits.

Now, description will be made of several preferred embodiments of this invention with reference to the drawing.

In this invention, in order to obtain a tilt detection signal which is stable and reliable, a special mark excellent in detecting characteristic is preliminarily formed in an optical disk medium without utilizing a header of a preformat for tilt detection. However, a marked area where the special mark is formed is inferior in recording/reproducing characteristic for use as a recording track for recording and reproducing data.

A greater number of special marks formed in different positions within an optical disk surface increases the number of opportunities for detection so as to obtain a stable and reliable tilt detection signal on one hand but reduces a data storage capacity on the other hand. In this invention, tilt characteristics of the optical disk medium are measured and examined so as to determine a most efficient arrangement of the special marks.

Figure 2:
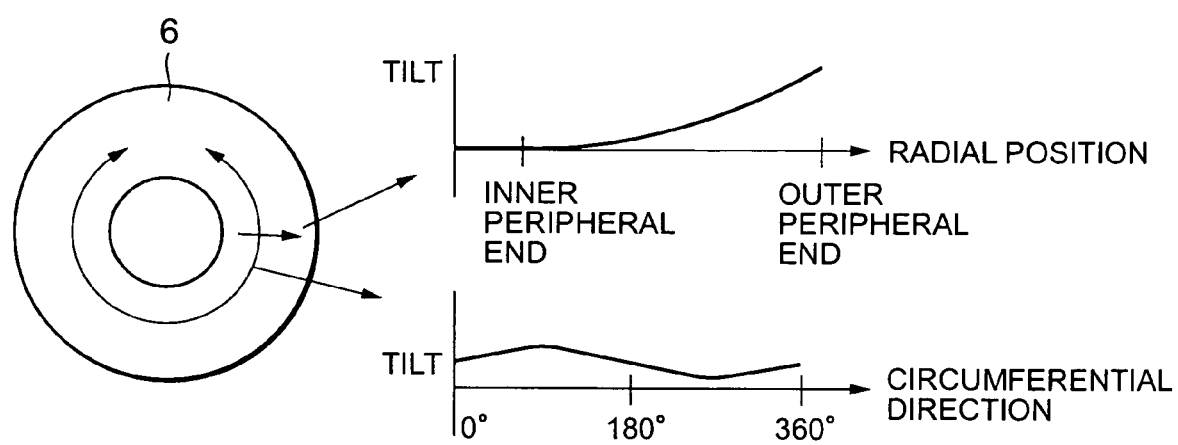
FIG. 2 shows tilting characteristics of an optical disk medium.

FIG. 2 shows the result of examining the in-plane distribution of medium tilts of an optical disk medium 6 in a radial direction. The tilt changes depending upon a radial position and a circumferential position depicted by two arrows are plotted, respectively. With respect to the radial position, the tilt is gradually changed and increased towards an outer periphery. The tilt change in the circumferential direction is not so large and generally exhibits a waveform substantially similar to a sine wave. A single round of 360° corresponds to a single cycle of the sine wave.

Figure 3:
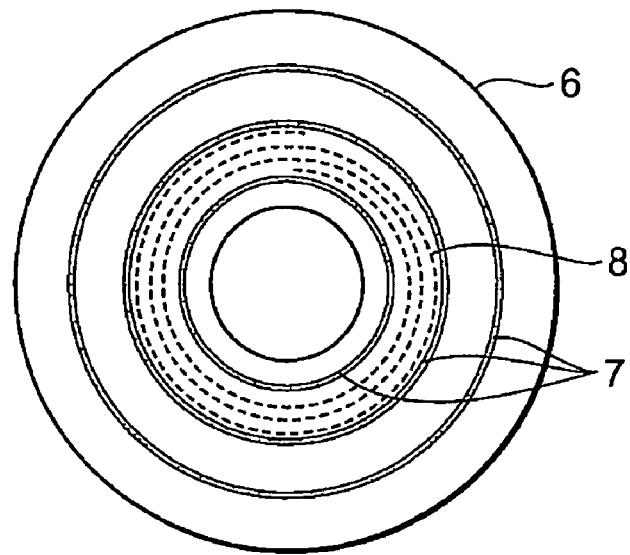
FIG. 3 shows an optical disk medium according to an embodiment of this invention.

Taking the above into consideration, this invention proposes the arrangement illustrated in FIG. 3.

The optical disk medium 6 is provided with a spiral recording track 8 formed throughout an entire surface thereof. A plurality of tilt detection areas 7 are discretely formed at a plurality of positions in the radial direction of the optical disk medium 6. As shown in the tilt change characteristics with respect to the radial position in FIG. 2, the tilt generally changes monotonously from the inner periphery towards the outer periphery in most of magnetic media. Rarely, a disk medium exhibits complicated change. However, such disk medium is often inferior in other characteristics, such as reproducing characteristics, and need not be taken into account. Therefore, by forming the tilt detection areas 7 only at about three positions at an inner periphery, an intermediate periphery, and an outer periphery, it is possible to considerably accurately estimate the tilt distribution of the optical disk medium as a whole. Thus, even in a remaining area except the tilt detection areas 7, the tilt control can be carried out. Although only a part of the spiral recording track 8 is shown in FIG. 3, the spiral recording track 8 is formed throughout the substantially entire surface of the optical disk medium as described above. If the tilt detection areas 7 can not be formed within a data recording region, the tilt detection areas 7 may be formed only at the inner periphery and the outer periphery which are not used as the data recording region.

In the circumferential direction, the tilt change in the form the sine wave is exhibited as described above. Therefore, in each of the tilt detection areas 7, a plurality of special marks (will later be illustrated) are formed on at least four positions at a substantially equal interval in the circumferential direction. By detecting the tilts at these positions and calculating the average of the tilts, it is possible to obtain an average tilt in a single round of 360° with practical accuracy.

A greater number of the tilt detection areas or a greater number of the special marks within a zone enables more stable and reliable detection. At any rate, in conformity with the characteristics of each individual optical disk medium, an optimum number is selected.

In the foregoing, it is assumed to use the average alone in the circumferential direction. Alternatively, the number of the special marks may be increased to detect a pattern of the change in the circumferential direction for use in tilt control.

Next, description will be made of an optical disk medium of a land/groove structure having both of a land recording track and a groove recording track.

Figure 4:
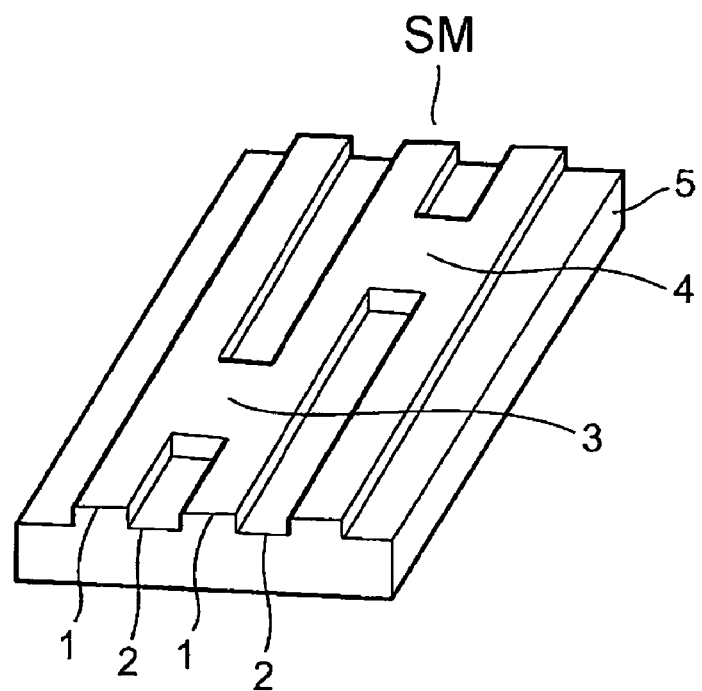
FIG. 4 shows a special mark in the embodiment of this invention.

As the special marks SM, those illustrated in FIG. 4 are effective. The land and the groove recording tracks 1 and 2 are formed on an optical disk substrate 5. A first coupling portion 3 is formed as a land structure coupling the land recording track 1 at the center and the land recording track 1 at the left side in the figure. On the other hand, a second coupling portion 4 is formed as a land structure coupling the land recording track 1 at the center and the land recording track 1 at the right side.

Each of the coupling portions 3 and 4 can easily be formed by leaving the land structure without exposing a part of a groove-forming portion during an exposing step for forming the groove in a material disk for the optical disk substrate 5. The above-mentioned structure does not require additional pits to be formed in addition to the grooves as described in conjunction with the prior art. Therefore, the above-mentioned structure is advantageous in that the detecting characteristic is not affected by the accuracy of pit positions.

The length of each of the coupling portions 3 and 4 must be greater than a certain measure in order to avoid the influence of disturbance in shape of a part where the groove recording track 2 is interrupted. It is noted that the diameter of an optical spot used in recording/reproducing operations is generally equivalent to a recording track interval. Taking the above into consideration, the length of each of the coupling portions 3 and 4 is not smaller than twice the interval between adjacent ones of the groove recording track 2. With this structure, a stable signal is obtained. Thus, if the length is not smaller than twice the interval, it is possible to assure the presence of the coupling portions 3 and 4 having a significantly large length as compared with the diameter of the optical spot. However, if the length of each of the coupling portions 3 and 4 is excessively long, the operation of following the recording track is affected. Therefore, the length must be suppressed within a range such that the servo characteristic is not affected.

Figure 5A:
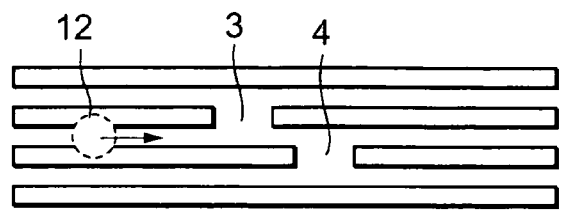
FIGS. 5A through 5C are views for describing detection characteristics in this invention.
Figure 5B:
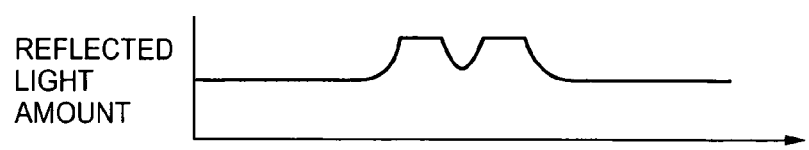
Figure 5C:
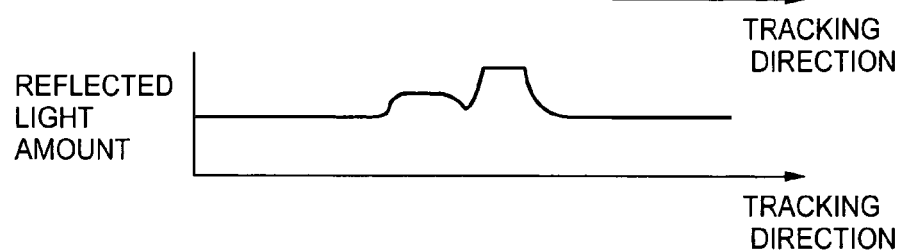

Referring to FIGS. 5A through 5C, description will be made of the signal reproducing characteristic at the recording track having the coupling portions 3 and 4 described above. As illustrated in FIG. 5A, the optical spot 12 follows the recording track provided with the first and the second coupling portions 3 and 4.

When the optical disk medium is not tilted, the waveform in FIG. 5B is obtained as the change in reflected light amount from the optical spot. At the positions of the first and the second coupling portions 3 and 4, the width of the groove seems to be widened so that the reflected light amount is increased. Since the shape of the optical spot is symmetrical on left and right sides, the increased amounts at the coupling portions 3 and 4 are equal to each other. On the other hand, if the tilt occurs in the radial direction perpendicular to the recording track, the shape of the optical spot becomes asymmetrical on the left and the right sides. In this event, the reflected light amount has the waveform shown in FIG. 5C.

Specifically, the reflected light amount is increased at one of the coupling portions 3 and 4 while the reflected light amount is decreased at the other. Depending upon the difference in reflected light amount between the first and the second coupling portions 3 and 4, the tilt can be detected. Depending upon which one of the reflected light amounts is increased, the direction of the tilt can be detected.

Figure 6:
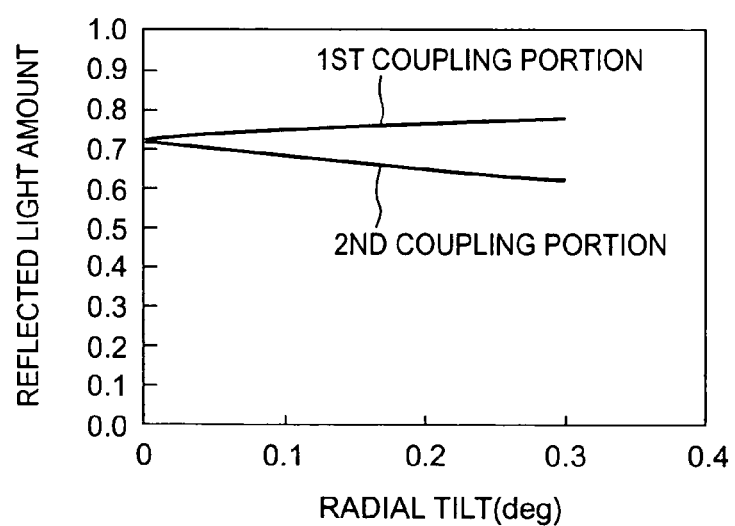
FIG. 6 is a view for describing the detection characteristics in this invention.

Referring to FIG. 6, the relationship between the tilt and the reflected light amount at each of the first and the second coupling portions 3 and 4 is shown. Measurement was carried out under the following conditions:

Light source wavelength: 405 nm
NA (Numerical Aperture) of the objective lens: 0.65
Thickness of the optical disk substrate: 0.6 mm
Width of the recording track: 0.34 μm
Depth of the groove: $\lambda/5$ The reflected light amount on the ordinate is normalized by the reflected light amount at a mirror surface without grooves. From the figure, it is seen that the changes in reflected light amount at the first and the second coupling portions 3 and 4 with respect to the tilt change exhibit different variation patterns.

Figure 7:
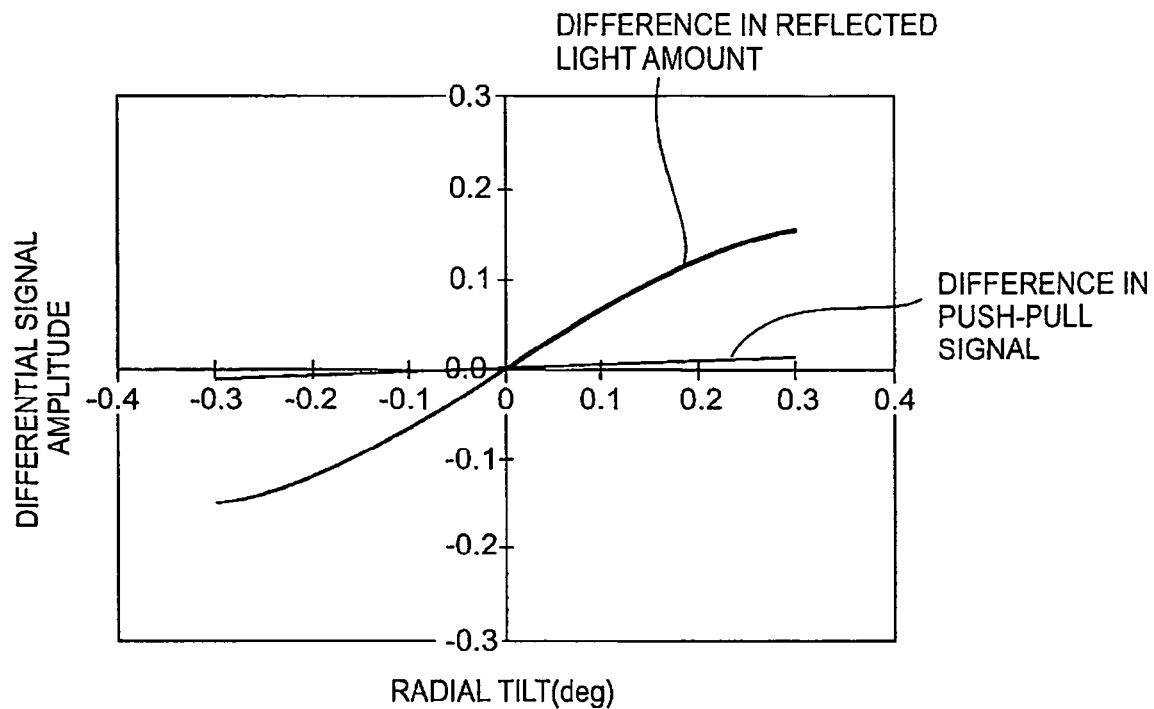
FIG. 7 is a view for describing the detection characteristics in this invention.

Referring to FIG. 7, the difference between the reflected light amounts at the first and the second coupling portions 3 and 4 is plotted with respect to negative and positive tilts. As seen from the figure, it is possible to sensitively detect the tilting direction and the tilting amount as small as 0.1 deg and to assure sufficient characteristics even in a next-generation high-density optical disk using a blue light source.

In FIG. 7, the difference between push-pull signal amplitudes at the first and the second coupling portions 3 and 4 is also plotted with respect to the negative and the positive tilts. As seen from the figure, it is obvious that the difference in signal amplitude is not substantially changed with respect to the tilt. It is supposed that the change in signal amplitude largely depends upon track offset or lens shift. In view of the above, the deviation in optical spot position owing to the track offset or the lens shift is compensated by the push-pull signal upon detection of the reflected light amount. In this event, it is possible to detect the tilt without an error.

Referring to FIGS. 4 and 5A, the first and the second coupling portions 3 and 4 need not be adjacent to each other but may be separated from each other in the tracking direction. However, in order that the first and the second coupling portions 3 and 4 have the same tilt, the first and the second coupling portions 3 and 4 are preferably arranged in close proximity to each other. In view of the reliability, it is desired to obtain the tilt from the difference between the reflected light amounts at the first and the second coupling portions 3 and 4 located in close proximity to each other.

The first and the second coupling portions 3 and 4 may be formed at different recording tracks, not on left and right sides of the same recording track. Alternatively, a single coupling portion may be separately observed from left and right recording tracks so as to obtain the reflected light amounts instead of those obtained at the first and the second coupling portions. In this event, since the recording tracks involved in measurement are different, the result of measurement tends to be affected by the difference in groove width between the two different tracks. Therefore, it is necessary to carefully set the measuring condition. In case where the coupling portions are defined as a disk specification, use is made of the ratio R1/R2 between a first reflected light amount R1 at the coupling portion and a second reflected light amount R2 at an ordinary tracking position except the coupling portion when the optical spot follows the groove recording track with the coupling portion.

For example, under the conditions described in conjunction with FIG. 6, the ratio R1/R2 may be defined to be not smaller than 1.10 (R1/R2≧1.10).

Figure 8:
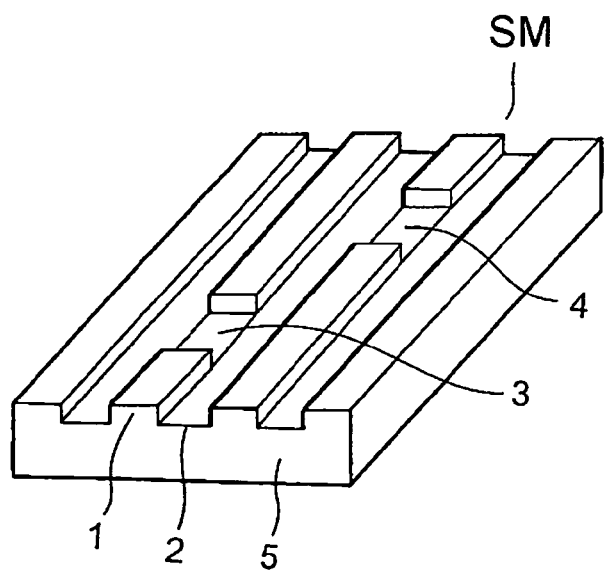
FIG. 8 shows a special mark according to another embodiment of this invention.

As the special marks SM, not only the above-mentioned land coupling structure between the adjacent ones of the land recording tracks 1 as shown in FIG. 4 but also a groove coupling structure illustrated in FIG. 8. Referring to FIG. 8, adjacent ones of the groove recording tracks 2 are coupled by coupling grooves formed on the optical disk substrate 5 as the first and the second coupling portions 3 and 4. In this case, during preparation of the material disk for the optical disk substrate 5, another spot different from an exposing spot for forming the groove recording track is irradiated onto a part of a land-forming portion so as to form the coupling groove coupling two adjacent grooves.

In case of the special marks having the above-mentioned groove structure, the optical spot follows the groove recording track 2 to detect the tilt. Further, if both of the special marks SM in FIG. 8 and the special marks SM in FIG. 4 are formed in the tilt detection areas 7 (FIG. 3), it is possible to detect the tilt from both of the land and the groove recording tracks 1 and 2.

Referring to FIG. 3, positions of the tilt detection areas 7 will be described.

In the optical disk medium 6 of a recordable type, the recording track 8 is divided into a plurality of segments (will later be illustrated) having a predetermined length. Format information such as an address is preliminarily recorded in every segment. In the optical disk medium 6 having a land/groove structure, preformat information prepared by pre-pits or wobbles may often be shared by the land recording track and the groove recording track adjacent to each other. In this event, it is difficult to adopt a CLV (Constant Linear Velocity) structure in which the linear recording density is constant throughout an entire surface of the disk medium. Therefore, use is made of a zone CAV (Constant Angular Velocity) structure or a zone CLV structure. In the zone CAV or CLV structure, the optical disk medium 6 is divided into a plurality of zones in the radial direction and the segments are aligned in the radial direction between the adjacent tracks within each zone.

Referring to FIG. 9A, description will be made of the optical disk medium 6 of a zone structure. The spiral recording track 8 is divided into a plurality of zones 9 in the radial direction. In the optical disk medium 6 having the zone structure, switching of the rotation speed is required around the zone boundary so that the format information can not stably be detected. Therefore, several tracks are reserves as a region which is not used for ordinary data recording (unrecorded tracks 10 in FIG. 9B).

In this invention, the unrecorded tracks 10 at the zone boundary are used as the tilt detection areas 7 in FIG. 3. Referring to FIG. 9B, an example of the special mark (including the first and the second coupling portions 3 and 4) arranged in the vicinity of the zone boundary is shown. On the inner side of the zone boundary, the unrecorded tracks 10 contain a combination of the land recording track 1 and the groove recording tracks 2 on opposite sides thereof. On opposite sides of the land recording tracks 1 in the combination, the first and the second coupling portions 3 and 4 are formed. On opposite sides of the combination, the unrecorded track 10 contain four pairs of the land recording track 1 and the groove recording track 2 adjacent to each other.

If the special mark is formed at a predetermined position within the segment, the position of the special mark is known by detecting the format information. Thus, stable detecting characteristics can be obtained.

The recording track having the coupling portion as the special mark may be formed on the outer side of the zone boundary. It is noted here that, if the special mark is formed across the boundary, it is difficult to detect the address information of the segment. In this event, the procedure for searching the position of the special mark is required.

Thus, in the optical disk medium having the land/groove structure, the tilt detection area (unrecorded tracks 10) in the vicinity of the zone boundary as shown in FIG. 8B. With this structure, the detection area is reserved without forming a new unrecorded region.

Next, description will be made of an example of the optical disk medium of the CLV structure having a predetermined linear recording density.

In the optical disk medium of the CLV structure, the grooves are often used as the recording track. This is because the format information is easily superposed on the recording track by wobbling the groove formed as a guide for the recording track.

In the above-mentioned recording track, it is effective to form the special mark in the tilt detecting area 7, as illustrated in FIG. 10A. In this case, the first and the second coupling portions 3 and 4 of the groove structure are formed, in the manner similar to FIG. 8B, in the tilt detection area 7 between adjacent ones of the groove recording tracks 2. The principle and the characteristic of the tilt detection are similar to those in case of the land/groove structure. The tilt is detected from the difference in reflected light amount at the two coupling portions upon following the recording track.

Even if the data are recorded in the recording track having the coupling portions 3 and 4, the data can not normally be read owing to variation in reflected light amount. Therefore, the recording track having the coupling portions 3 and 4 can not be used as an ordinary data recording region. Thus, at least three recording tracks must be reserved as the tilt detection area 7. However, if these recording tracks are left unrecorded, there arises a problem in case of a recordable optical disk in which tracking servo is performed by recording pits after recording. Under the circumstances, it is desired to record dummy data in the tilt detection area 7 in case where data are recorded in the recording track before and after the tilt detection area 7. In this case, a portion of the recording track around the special mark except the special mark and its neighborhood is filled with recording pits 20 to store the dummy data, as shown in FIG. 10B. Then, it is possible to detect the tilt.

Next, description will be made of the radius of the tilt detection area.

Figure 11:
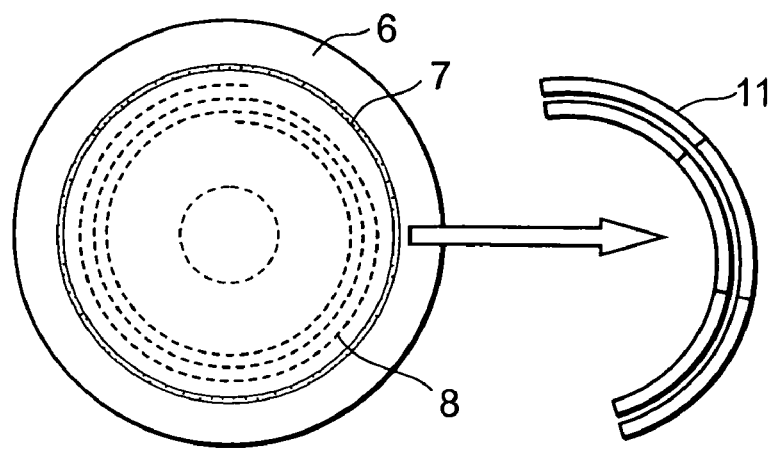
FIG. 11 shows an optical recording medium having a CLV structure.

Referring to FIG. 11, the optical disk medium 6 of the CLV structure is shown. The spiral recording track 8 is divided into a plurality of segments of a predetermined length. In case of the CLV structure, the positional relationship between the segments in the adjacent recording tracks is not fixed but is changed at the radial position. Therefore, the radial position at which the length of a single round of 360° corresponds to an integral multiple of the segment length is selected as the position of the tilt detection area 7. At that portion, the segments 11 are substantially aligned in the radial direction as shown at the right side in FIG. 11. Therefore, it is possible to form the special marks at specific positions of the segments over a single round of 360°, like in the optical disk medium of the land/groove structure.

For example, it is assumed that, at the radial position of 24 mm, just 10 segments are formed in a single round of 360°. This means that each segment has a length of 2.4 mm. Then, at every radial position where the radius is increased by 2.4 mm, an integral number of address segments are exactly formed in a single round of 360°. Specifically, the radial positions of 26.4 mm, 28.8 mm, and 31.2 mm are obtained as the radial positions at which the tilt detection areas 7 can be formed. If the recording track extends to the radius of 58 mm, 14 tilt detection areas 7 can be formed.

In the foregoing embodiments, the special marks are implemented by a combination of the land and the groove structures. Not being limited thereto, various other types of special marks may be used. For example, as far as the positional accuracy upon production is assured, use may be made of pre-pits formed at the boundary between the land and the groove, like in the prior art described above. However, it is required to assure a certain pit length in the tracking direction without using the pre-pits in common for the format information so as to achieve stable signal detection.

In the foregoing, the special marks are described assuming that the tilt in the radial direction perpendicular to the recording track is detected. Alternatively, as shown in FIG. 12, it is possible to detect the tilt in the tracking direction by providing an additional pattern.

Figure 12:
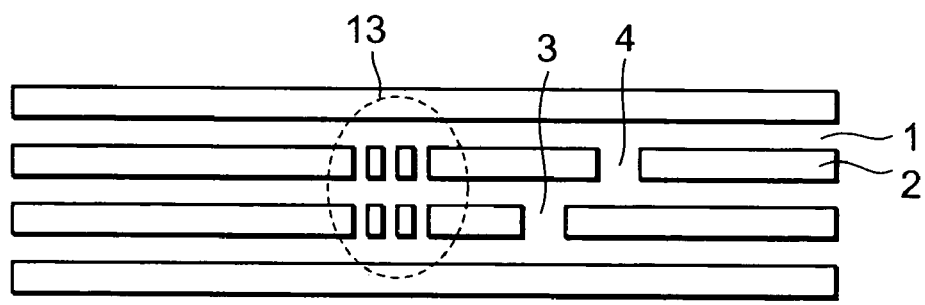
FIG. 12 shows a special mark according to another embodiment of this invention.

Referring to FIG. 12, microscopic patterns 13 are further formed in the land recording track 1 and the groove recording track 2 in the vicinity of the first and the second coupling portions 3 and 4. In the example being illustrated, the first and the second coupling portions 3 and 4 are formed by the land structure and the microscopic patterns 13 are also formed by the land structure. In this example being illustrated, the microscopic patterns 13 are implemented by periodic discontinuities or breaks of the groove (periodic discontinuities or breaks of the groove by interposition of lands). Each of the breaks is not longer than the optical spot diameter. The variation amplitude of the reflected light obtained from the microscopic patterns 13 is decreased when the tilt occurs in the tracking direction and the optical spot diameter is lengthened by aberration. Therefore, the tilt in the tracking direction can be detected by the change in variation amplitude.

For example, in case of the optical disk medium in which 1-7 codes are recorded by NRZI (Non-Return-to-Zero Inverted), use of a signal having a period on the order of 8T is proposed. As will readily be understood, the number of repetition of patterns is not restricted to a small number as shown in FIG. 12 but may be 10 or more so as to detect the amplitude variation from the envelope. In the latter case, the accuracy is improved.

Figure 13:
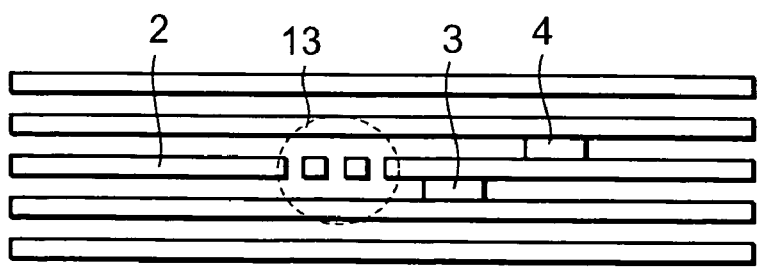
FIG. 13 shows a special mark according to another embodiment of this invention.

In case of the groove recording track, the microscopic patterns 13 are formed by discontinuities or breaks of the groove in the groove recording track itself as shown in FIG. 13.

Figure 14:
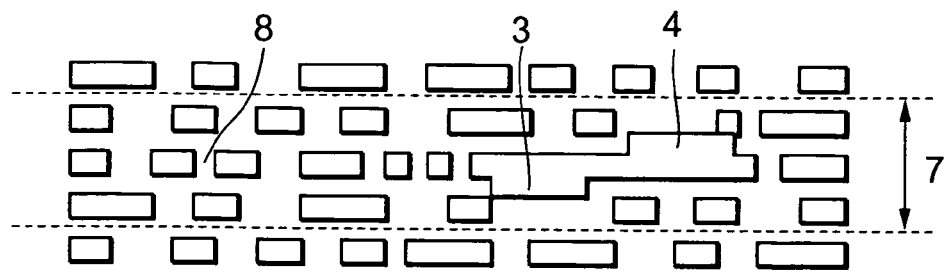
FIG. 14 shows a special mark according to another embodiment of this invention.

Furthermore, this invention is also applicable to a ROM medium which inherently has no groove structure. Referring to FIG. 14, the recording track 8 formed by a pit sequence is provided with the tilt detection area 7. Within the tilt detection area 7, the special mark having the first and the second coupling portions 4 is formed. The special mark comprises a long pit in the recording track itself and a coupling pit forming a coupling portion between the long pit and the land in each of the adjacent recording tracks.

Figure 15:
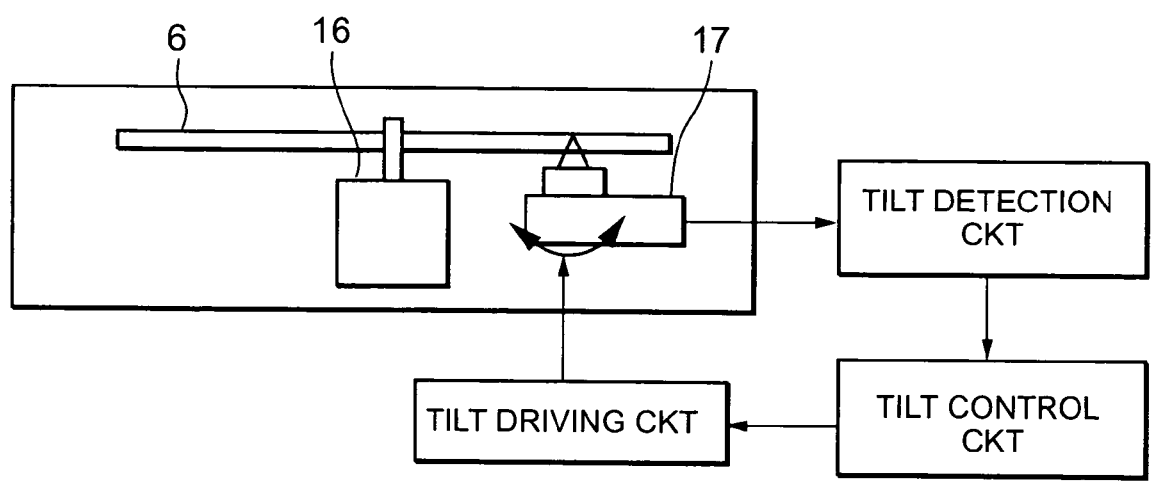
FIG. 15 shows an optical disk recording/reproducing apparatus according to an embodiment of this invention.

Referring to FIG. 15, an optical disk recording/reproducing apparatus according to an embodiment will be described. The optical disk medium 6 is mounted on a spindle 16 and subjected to information recording/reproducing operations by an optical head 17. With reference to the reflected light amount detected from the special mark, a tilt detection circuit detects the tilt between the optical disk medium and the optical head. A tilt control circuit calculates the average in each single round of 360° and the estimated tilt for a data region without the tilt detection area and sends a control signal to a tilt driving circuit. The tilt driving circuit is responsive to the control signal and drives a tilt mechanism formed at the optical head 17 or the like.

For example, the tilt mechanism changes the tilt of a whole of a carriage structure having a guide shaft for moving the optical head in the radial direction. In a recent recordable DVD, use is often made of a lens actuator mechanism for finely and precisely move the lens in a focusing direction and a tracking direction. The tilt mechanism may utilize such an actuator mechanism provided with the function of moving the lens also in the tilt direction.

In the radius near the tilt detection area, tilt control is carried out by the use of the detected value. On the other hand, tilt control in a region between two adjacent tilt detection areas may be carried out in several manners.

An easiest method is as follows. In the optical disk medium, the spiral recording track is successively subjected to recording/reproducing operations from an inner periphery towards an outer periphery. Therefore, after passing through one of the tilt detection areas and before the recording/reproducing operation reaches a next tilt detection area, use is made of the last detected value obtained in the tilt detection area which has been passed immediately before. In case where the variation in the radial direction is not so large and the tilt detection areas can be set at a certain frequency, this method is simple and effective.

However, if only a few tilt detection areas are formed in the radial direction, the tilt in a region between the tilt detection areas must be estimated by interpolation or the like. In this event, the tilts are preliminarily measured in a plurality of tilt detection areas and measured values are memorized prior to the recording/reproducing operations.

What is claimed is:

1. An optical disk medium having a spiral recording track, wherein:
   said optical disk medium comprises a plurality of tilt detection areas formed at a plurality of radial positions on said medium, each of said tilt detection areas having a plurality of special marks (SM) for detecting a plurality of tilts of said medium in a single round of said medium;
   a plurality of grooves are periodically formed in a radial direction of said medium, said optical disk medium having, as said recording track, said grooves or a plurality of lands between said grooves or both of said grooves and said lands; and
   each of said special marks being formed by first and second coupling portions arranged in close proximity to each other in a tracking direction along which said recording track extends, said first coupling portion being formed as a coupling groove having a depth substantially equal to that of said grooves and a length in said tracking direction which is longer than twice a groove pitch of said grooves, said first coupling portion coupling a particular one of the grooves and one of two grooves adjacent to said particular groove on opposite sides thereof, said second coupling portion being formed as a coupling groove having a depth substantially equal to that of said grooves and a length in said tracking direction which is longer than twice said groove pitch, said second coupling portion coupling said particular groove and the other of said two grooves.

2. An optical disk medium according to claim 1, in which said spiral recording track is divided into a plurality of zones in a radial direction of said medium, wherein:
   each of said tilt detection areas is located within an area which is formed in the vicinity of a zone boundary between said zones and which is not used in recording data.

3. An optical disk medium according to claim 1, in which said spiral recording track having a predetermined linear recording density is divided into a plurality of segments having a predetermined segment length and added with address information, wherein:
   each of said detection areas is located on the recording track in the vicinity of a radial position at which the length of the recording track in a single round of said medium corresponds to an integral multiple of said segment length.

4. An optical disk medium having a spiral recording track said optical disk medium comprising:
   a plurality of tilt detection areas formed at aplurality of radial positions on said medium, each of said tilt detection areas having a plurality of special marks (SM) for detecting a plurality of tilts of said medium in a single round of said medium
   a plurality of grooves are periodically formed in a radial direction of said medium, said optical disk medium having, as said recording track, both of said grooves and lands between said grooves; and
   each of said special marks being formed by first and second coupling portions arranged in close proximity to each other in a tracking direction along which the recording track extends, said first coupling portion being formed as a coupling land having a height substantially equal to that of said lands and a length in said tracking direction which is longer than twice a groove pitch of said grooves, said first coupling portion coupling a particular one of said lands and one of two lands adjacent to said particular land on opposite sides thereof, said second coupling portion being formed as a coupling land having a height substantially equal to that of said lands and a length in said tracking direction which is longer than twice said groove pitch, said second coupling portion coupling said particular land and the other of said two lands.

5. An optical disk medium according to claim 4, in which said spiral recording track is divided into a plurality of zones in a radial direction of said medium, wherein:
   each of said tilt detection areas is located within an area which is formed in the vicinity of a zone boundary between said zones and which is not used in recording data.

6. An optical disk medium according to claim 4, in which said spiral recording track having a predetermined linear recording density is divided into a plurality of segments having a predetermined segment length and added with address information, wherein:
   each of said detection areas is located on the recording track in the vicinity of a radial position at which the length of the recording track in a single round of said medium corresponds to an integral multiple of said segment length.

7. An optical disk recording/reproducing apparatus for recording or reproducing data on an optical disk medium, said optical disk medium comprising: a plurality of grooves as a recording track; and a plurality of special marks (SM), each of said special marks being formed by first and second coupling portions arranged in close proximity to each other in a tracking direction along which the recording track extends, said first coupling portion coupling a particular one of said grooves and one of two grooves adjacent to said particular groove on opposite sides thereof, said second coupling portion coupling said particular groove and the other of said two grooves, the optical disk recording/reproducing apparatus comprising:

a detector adapted to detect reflected light amount at each of said first and said second coupling portions when an optical spot follows said recording track; and a tilt controller adapted to calculate a medium tilt of said medium from the change in the reflected light amount at each of said first and said second coupling portions.

8. An optical disk recording/reproducing apparatus according to claim 7, said plurality of special marks being formed in a single round track of said medium, said apparatus further comprising:

a tilt driver adapted to perform tilt drive by the use of an average of the medium tilts detected and calculated at said plurality of special marks formed in the single round track of said medium.

9. An optical disk recording/reproducing apparatus for recording or reproducing data on an optical disk medium, said optical disk medium comprising: a plurality of lands as a recording track; and a plurality of special marks (SM), each of said special marks being formed by first and second coupling portions arranged in close proximity to each other in a tracking direction along which said recording track extends, said first coupling portion coupling a particular one of said lands and one of two lands adjacent to said particular land on opposite sides thereof, said second coupling portion coupling said particular land and the other of said two lands, the optical disk recording/reproducing apparatus comprising:

a detector adapted to detect reflected light amount at each of said first and said second coupling portions when an optical spot follows said recording track; and a tilt controller adapted to calculate a medium tilt of said medium from the change in the reflected light amount at each of said first and said second coupling portions.

10. An optical disk recording/reproducing apparatus according to claim 9, said plurality of special marks being formed in a single round track of said medium, said apparatus further comprising:

a tilt driver adapted to perform tilt drive by the use of an average of the medium tilts detected and calculated at said plurality of special marks formed in the single round track of said medium.

* * * * *